United States Patent
Brück et al.

(10) Patent No.: US 6,460,667 B1
(45) Date of Patent: Oct. 8, 2002

(54) SUPPORT ASSEMBLY HAVING A SUPPORTING STRUCTURE AND A DEFORMATION ELEMENT FOR OBLIQUE INTRODUCTION OF FORCE, VEHICLE BUMPER SYSTEM AND METHOD OF PRODUCING A SUPPORT ASSEMBLY

(75) Inventors: Rolf Brück, Bergisch Gladbach; Carsten Kruse, Lohmar; Raimund Strigl, Reichertshofen, all of (DE)

(73) Assignee: Emitec Gesellschaft fur Emissionstechnologie MbH, Lohmar (DE)

( * ) Notice: Subject to any disclaimer, the term of this patent is extended or adjusted under 35 U.S.C. 154(b) by 0 days.

(21) Appl. No.: 09/707,551

(22) Filed: Nov. 7, 2000

Related U.S. Application Data

(63) Continuation of application No. PCT/EP99/02993, filed on May 3, 1999.

(30) Foreign Application Priority Data

May 7, 1998 (DE) ......................................... 198 20 433

(51) Int. Cl.$^7$ .................................................. F16F 7/12
(52) U.S. Cl. ...................... 188/371; 188/377; 293/102; 293/132
(58) Field of Search ................................ 188/371, 377, 188/376; 267/139, 151; 293/102, 103, 132, 133, 104, 109

(56) References Cited

U.S. PATENT DOCUMENTS

| | | | |
|---|---|---|---|
| 3,252,548 A | * | 5/1966 | Pajak et al. ................ 188/371 |
| 3,865,415 A | | 2/1975 | Saxl et al. |
| 4,327,938 A | | 5/1982 | Geissler et al. |
| 4,666,130 A | | 5/1987 | Denman et al. |
| 4,822,011 A | | 4/1989 | Goldbach et al. |
| 5,542,365 A | * | 8/1996 | Jurisich et al. ......... 188/377 X |
| 5,599,043 A | | 2/1997 | Fujita et al. |

FOREIGN PATENT DOCUMENTS

| | | |
|---|---|---|
| DE | 38 09 490 C1 | 5/1989 |
| DE | 89 00 467.1 U1 | 6/1990 |
| DE | 40 24 942 A1 | 2/1992 |
| DE | 195 22 575 A1 | 1/1996 |
| DE | 44 45 557 A1 | 6/1996 |
| DE | 196 50 647 A1 | 4/1997 |
| EP | 0 009 654 A1 | 4/1980 |
| EP | 0 389 750 A1 | 10/1990 |
| GB | 2 029 720 A | 3/1980 |
| JP | 09 109 920 | 4/1997 |
| WO | WO-98/06553 | * 2/1998 |

* cited by examiner

*Primary Examiner*—Pam Rodriguez
(74) *Attorney, Agent, or Firm*—Laurence A. Greenberg; Werner H. Stemer; Gregory L. Mayback

(57) ABSTRACT

A support assembly for an oblique introduction of force and an absorption of kinetic energy during an impact, especially for a motor vehicle, includes a supporting structure and a deformation element. The deformation element rests with at least one side against a support element on the support structure and has a honeycomb matrix body with a longitudinal axis and hollow chambers formed by walls. The deformation element is fixed to the support structure in such a way that at least a part of forces generated during in impact are introduced into the walls at an angle relative to the main direction in which the walls extend. A vehicle bumper system and a method of producing a deformation element are also provided.

41 Claims, 8 Drawing Sheets

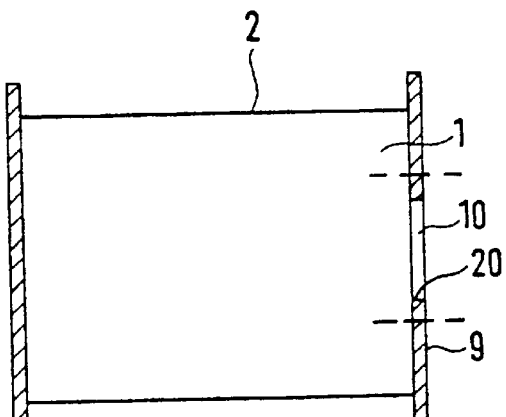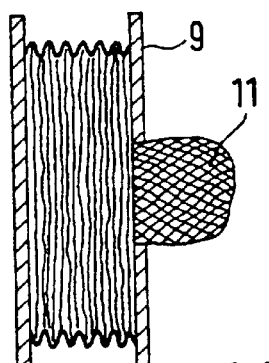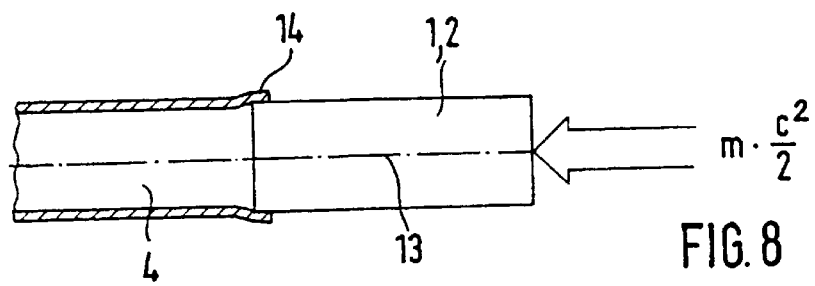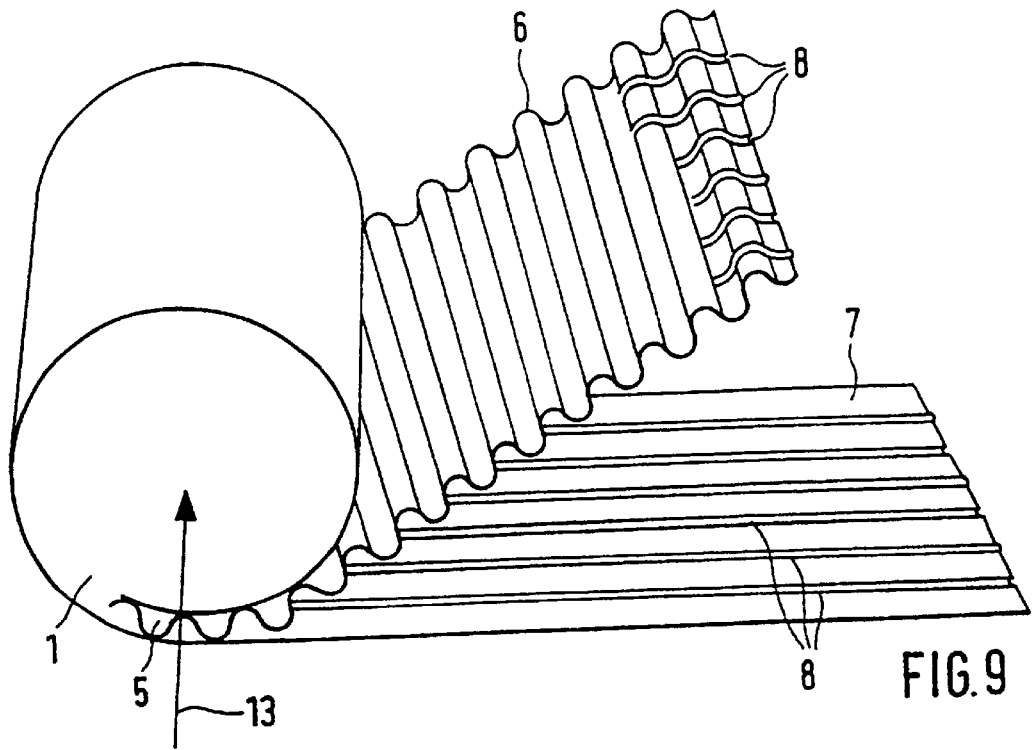

SUPPORT ASSEMBLY HAVING A SUPPORTING STRUCTURE AND A DEFORMATION ELEMENT FOR OBLIQUE INTRODUCTION OF FORCE, VEHICLE BUMPER SYSTEM AND METHOD OF PRODUCING A SUPPORT ASSEMBLY

CROSS-REFERENCE TO RELATED APPLICATION

This application is a continuation of copending International Application No. PCT/EP99/02993, filed May 3, 1999, which designated the United States.

BACKGROUND OF THE INVENTION

Field of the Invention

The invention relates to a support assembly, in particular for a motor vehicle, for absorbing kinetic energy during an impact, including a supporting structure and a deformation element for oblique introduction of force. The deformation element is supported at least at one end at a support at the supporting structure and has a honeycomb matrix body with a longitudinal axis and cavities formed by walls. The invention also relates to a vehicle bumper system and a method of producing a support assembly.

Deformation elements for absorbing kinetic energy are used in various areas of engineering. One particular area of application for elements of that kind is in motor vehicles. Technical and safety standards require that, in the case of minor impacts, impact energy should be absorbed in an essentially elastic manner by corresponding elements. In the case of more severe impacts, e.g. in the case of accidents, the kinetic energy should be absorbed by elements and converted into deformation of the latter. Thus, for example, the prior art includes deformation elements which are used for longitudinal members of a vehicle and which remain undamaged in the event of an impact up to 4 km/h and, in the case of an impact up to 15 km/h, absorb the entire kinetic energy and convert it into deformation. In general, such deformation elements are integrated into the longitudinal member to form a unitary supporting structure, with the result that the entire longitudinal member has to be replaced in the event of damage. The requirement that essentially the entire kinetic energy should be absorbed by the deformation elements without a significant proportion of that deformation energy being transmitted to the other structures of a motor vehicle, is one that must also be satisfied with a view to increasing the survival chances of people in vehicles that are involved in an accident.

Honeycomb structures are used in many different ways for various applications in engineering. For example, honeycomb structures are used in the construction of aircraft, where requirements for lightweight construction and high strength, in particular, are important. Honeycomb structures are also known from areas where it is not so much the strength of such a honeycomb structure as increasing the surface area which is important. For example, they are used in the case of catalyst substrates in the exhaust system of a motor vehicle for removing the noxious exhaust components that remain in the exhaust after combustion in the engine.

German Utility Model G 89 00 467 U1, European Patent Application 0 389 750 A1, UK Patent Application GB 2 029 720 A, German Published, Non-Prosecuted Patent Application DE 40 24 942 A1, German Patent DE 38 09 490 C1 and German Published, Non-Prosecuted Patent Application DE 44 45 557 A1, corresponding to U.S. application Ser. No. 08/879,594, filed Jun. 20, 1997, now U.S. Pat. No. 6,334,981, have disclosed various configurations and structures for honeycomb bodies. In general, those honeycomb bodies that have been described are used to improve flow characteristics in the channels of the matrix body, which are constructed as flow channels, in order to obtain improved chemical reactions. The jacketing configurations surrounding the actual matrix body are used to absorb high thermal loads, to which catalyst substrates of that kind are exposed in the exhaust system of a motor vehicle.

German Published, Non-Prosecuted Patent Application DE 196 50 647 A1 has disclosed a deformation element for a motor vehicle, in which a honeycomb body that is known per se and disposed in a jacketing tube is used as a deformation element.

The disadvantage of the known deformation elements is that they are either integrated completely into the supporting structures, necessitating replacement of the entire supporting structure in the event of damage or, where deformation elements with a honeycomb structure are used, a steep initial rise in a curve describing a deformation force/deformation path profile (F,s profile) occurs relatively quickly if high kinetic energy is introduced. That can lead to high deformation forces that occur being transmitted directly into the supporting structure and the latter being deformed plastically as a result.

Summary of the Invention:

It is accordingly an object of the invention to provide a support assembly having a supporting structure and a deformation element for oblique introduction of force and absorption of kinetic energy, which ensures a desired F,s profile, in accordance with a respective application-specific construction, as compared with a conventional deformation element, as well as a vehicle bumper system and a method of producing a support assembly, which overcome the hereinafore-mentioned disadvantages of the heretofore-known devices and methods of this general type.

With the foregoing and other objects in view there is provided, in accordance with the invention, a support assembly, in particular for a motor vehicle, for absorbing kinetic energy during an impact, comprising a supporting structure having a support; and a deformation element having a honeycomb matrix body with a longitudinal axis and walls forming cavities, the walls having a main direction of extension, the deformation element having at least one end supported at the support of the supporting structure, and the deformation element secured at the supporting structure for introducing at least some forces developed during an impact into the walls at an angle to the main direction of extension.

In accordance with another feature of the invention, the matrix body is made up of at least one at least partially structured layer of sheet metal by looping, winding or stacking, preferably into a cylindrical form. A honeycomb matrix body produced in this way is made, for example, from a combination of corrugated and essentially smooth layers of sheet metal, which are disposed alternately to one another. This gives rise within the matrix body to cavities, which are bounded by the walls formed by the layers of sheet metal. The walls extend essentially in the direction of the longitudinal axis of the matrix body. The cavities are preferably constructed as channels, which extend coaxially to the longitudinal axis of the matrix body, for example. If a deformation element with a matrix body of this kind is secured on the supporting structure in such a way that the forces introduced during an impact act essentially in the direction of the walls, the deformation energy is absorbed inter alia by the fact that the walls are subjected to a buckling load, i.e. are compressed. That results in a relatively sharp rise in the deformation force/deformation path profile (F,s profile) immediately after the introduction of the kinetic energy. This steep initial rise or initial peak in the F,s profile has the effect of introducing relatively high deformation forces into the supporting structure through the deformation element before the latter is deformed and thereby absorbing kinetic energy. As a result, it is possible for the supporting structure to undergo plastic deformations due to the peaks in the deformation force. However, this is to be avoided since, in keeping with its function, the deformation element is intended to absorb the kinetic energy and prevent the supporting structure from undergoing plastic deformation.

According to the invention, provision is therefore made for the deformation element to be constructed or disposed relative to the supporting structure in such a way that the forces developed during an impact are introduced at an angle to the main direction of extension of the walls. That direction is defined in relation to the longitudinal axis. It is ensured that the walls can be deformed into the cavities more easily, in particular at the onset of deformation, by introducing the forces obliquely in this way. As a result, the initial peak in the F,s profile is at least greatly reduced. At least the initial region of the F,s profile can thus be influenced in a specifically targeted manner to yield an improvement in the absorption of kinetic energy being introduced, through the use of a deformation element of this kind according to the invention.

According to one exemplary embodiment of the invention, the main direction of extension of the layers of sheet metal forming the walls is disposed at an angle to the longitudinal axis. This can be achieved, for example, by winding the individual structured layers of sheet metal obliquely. In accordance with an added feature of the invention, if the main direction of extension of the walls forms an angle with the longitudinal axis, the deformation element can be secured on the supporting structure in such a way that the longitudinal axis is disposed essentially perpendicular to the support on the supporting structure.

However, it is also possible to use a conventional matrix body, in which the main direction of extension of the walls is essentially coaxial with the longitudinal axis of the matrix body. In accordance with an additional feature of the invention, the matrix body is secured on the supporting structure in such a way that its longitudinal axis is disposed at an angle, that is not a right angle, to the support on the supporting structure.

In accordance with yet another feature of the invention, the layer or layers of sheet metal are wound, looped or stacked in such a way that a conical or frustoconical matrix body is formed. A conical or frustoconical matrix body of this kind is preferably disposed on the supporting structure in such a way that its longitudinal axis is essentially perpendicular to the support on the supporting structure, thereby likewise achieving an oblique introduction of forces relative to the main direction of extension of the walls.

In accordance with yet a further feature of the invention, there is provided a multiplicity of predetermined deformation points disposed in the layers of sheet metal forming the walls. As a result, the F,s profile of the deformation element is constant at least in certain sections or at least in one section. One significant advantage of an F,s profile that is constant at least in certain sections is that, when kinetic energy is introduced into the deformation element, the latter is deformed uniformly and transmission of the absorbed kinetic energy to the supporting structure is very largely avoided.

In accordance with yet an added feature of the invention, the predetermined deformation points in the walls of the matrix body are provided and constructed in such a way that the F,s profile of the deformation element is made to rise progressively, at least in one section or in certain sections. At the same time, the rise in the F,s profile is configured in such a way that, at the end of the deformation travel, at which the so-called residual block length of the deformation element is reached, the maximum force is preferably below a value at which the supporting structure undergoes plastic deformation.

In accordance with another feature of the invention, the cavities of the matrix body are constructed as channels, so that as a result the matrix body has a multiplicity of channels. Layers of sheet metal having a thickness of 0.02 mm to 0.2 mm are preferably used, and the matrix body preferably has a cell density of 50 to 600 cpsi (cells per square inch). When aluminum sheets are used, a thickness of 0.05 to 0.2 mm is preferred and, in the case of steel sheets, in particular deep-drawing steel, a thickness of 0.02 to 0.15 mm is preferred.

In accordance with yet an additional feature of the invention, the deformation element is provided, at least at one end at which there is a support on the supporting structure, with a perforated plate having at least one hole. The at least one hole in the perforated plate is dimensioned in such a way that parts of the matrix body situated in the area of the hole can be displaced into the hole or through the hole in the direction of the deformation if a high kinetic energy is introduced. The displacement of parts of the matrix body which are situated in the area of the hole through the hole or into the hole in the direction of the main deformation occurs even before the residual block length is reached. Shearing off of individual layers of sheet metal in the region of the edge of the holes and compression of the layers of sheet metal occur essentially simultaneously, with the result that parts of the matrix body enter or pass through the hole. Once the residual block length has been reached, the deformation element still has a certain residual porosity. The matrix body preferably has a jacketing configuration which is constructed in such a way that it folds uniformly, preferably in the form of rings, during deformation.

One of the significant advantages of this construction according to the invention, as compared with a construction having an end plate without a hole, i.e. not a perforated plate, is that, when the maximum deformation travel is reached, the resulting residual block length is reduced and, as a result, the maximum deformation travel is increased. That is because the at least one hole in the perforated plate is dimensioned in such a way that, under the action of compressive and shearing forces, parts of the matrix body which are disposed in the area of the hole are pushed into the hole or even out of the hole when further kinetic energy is introduced into the deformation element. As a result, the steep rise that occurs in the F,s profile when the residual block length is reached, i.e. the rear region of the F's profile, such as that which occurs in the case of a deformation element with a closed cover plate disposed at its end or where the end of that deformation element rests fully against the support of the supporting structure, is pushed back further, i.e. shifted to the right in the F,s profile.

In accordance with again another feature of the invention, the perforated plate has a plurality of holes, which can be distributed uniformly or nonuniformly in the surface of the perforated plate. In this configuration, the size of the holes is preferably such that those parts of the matrix body which are disposed in the area of the holes can essentially push into or through all of the holes under the action of the deformation and shearing forces when kinetic energy is introduced.

In accordance with again a further feature of the invention, the edge of the respective hole is constructed in such a way that it extends over as many layers of sheet metal as possible. This is necessary to ensure that the layers of sheet metal of the matrix body which are situated in the area of the edge of the hole are sheared off through the use of shearing forces instead of individual parts of the matrix body being displaced through the hole in a telescope-manner without shearing taking place. In accordance with again an added feature of the invention, the holes are preferably disposed in the outer area of the perforated plate. This has the advantage of achieving an interaction between the jacketing configuration and the matrix body during deformation. Since parts of the matrix body can be displaced through the holes in the perforated plate in the direction of the deformation, in particular in the outer area, the cavity which is thus created can be compressed by the lateral force imposed by the jacketing configuration during deformation. A shortening of the residual block length can thereby be achieved.

In accordance with again an additional feature of the invention, about 20 to 80%, preferably 40 to 60%, of the total area of the perforated plate is formed by holes. This ensures sufficient space through which or into which sheared-off parts of the matrix body can pass through the perforated plate when a high kinetic energy is introduced. The edges of the holes are preferably constructed in such a way that they extend over at least ten layers of sheet metal. If a single hole is provided and the diameter of the matrix body is 90 mm, for example, the diameter of the hole can be about 55 mm. However, the corresponding holes in the perforated plate can differ therefrom with regard to their configuration and size, depending on the application and the desired $F_s$ profile.

In accordance with still another feature of the invention, the perforated plate is integrated through the use of its edge into the support of the supporting structure. On one hand, this ensures that adequate supporting forces are available and, on the other hand, that a high deformation energy can be introduced.

In accordance with still a further feature of the invention, the jacketing configuration is constructed in the form of a plurality of separate jacketing rings or in the form of a continuous jacketing tube with predetermined buckling points. Depending on the construction of the jacketing configuration, the kinetic energy is absorbed both by the matrix body and the jacketing configuration to a greater or lesser extent. The deformation element is supported or held in the supporting structure at one or both ends in such a way that the kinetic energy to be absorbed can be introduced essentially in the longitudinal direction of the deformation element. By virtue of the construction of the honeycomb matrix body with a multiplicity of channels, the formation of a perforated plate with holes of defined dimensions, the thicknesses and types of material etc., there is great flexibility of layout with regard to the achievement of specific dimensioning of the deformation element according to the invention for particular applications. It is thus possible to achieve a desired $F_s$ profile.

If the deformation element has a tubular construction, it is also referred to as a deformation tube (DEFO tube). In principle, the deformation element is constructed in such a way, by appropriate shaping and selection of the above-mentioned parameters, that a maximum deformation travel is achieved for the given dimensions of the component. This is possible, for example, by folding or compressing the jacketing configuration and/or the matrix to absorb the kinetic energy.

Another advantage of such a deformation element according to the invention is that ease of fitting and removal can be achieved through the use of a special construction of the deformation element including its jacketing configuration. The respective construction of the jacketing configuration and of the respective honeycomb structure of the matrix body furthermore serves to enable load-bearing properties to be achieved. Those properties must be ensured if the deformation element according to the invention is to be integrated or embedded into frame or supporting structures, making it possible to transmit loads at which the deformation element is capable of absorbing even the kinetic energy that occurs during impact loading. A suitable choice of material will furthermore enable corrosion-resistant material to be used for the deformation element according to the invention if the respective application demands it. However, it is also possible to sacrifice corrosion-resistant materials for reasons of cost and to provide the materials used for the element according to the invention with an anti-corrosion coating that is known per se.

The respective $F_s$ profile can thus be influenced in a specifically targeted manner through the use of the construction both of the matrix and of the jacketing configuration. An essentially smooth jacketing configuration, for example, helps to provide a high load-bearing capacity. If the jacketing configuration is constructed as expanded metal or has holes or discontinuities, for example, a maximum deformation travel can be achieved. The specific deformation behavior of the deformation element can likewise be influenced in a specifically targeted manner by placing beads, notches, grooves, etc. in the jacketing configuration. The strength can furthermore be influenced through the use of the respective thickness of the jacketing configuration and the material chosen for the jacketing configuration.

It is also possible to use the construction of the matrix body to influence the deformation behavior in a specifically targeted manner through the use of layers of sheet metal with transverse structures, for example. A maximum deformation travel can be achieved if the individual layers of sheet metal have holes, slots or longitudinal structures. The strength and weight of the deformation element according to the invention can furthermore be influenced in a specifically targeted manner through the use of its cell density, sheet thickness and method of winding of the matrix body. This can also be achieved, for example, through the use of oblique corrugations by using a cross-wound configuration. It is furthermore also possible to construct the matrix body in such a way that radial rigidity is reduced at the edge.

In accordance with still an added feature of the invention, the jacketing configuration has a bead or a plurality of beads disposed essentially transversely to the channels of the matrix. The advantage of these beads is that, if the kinetic energy is introduced essentially in the longitudinal direction of the deformation element, the beads on one hand have a certain initial elasticity and on the other hand represent points at which the jacket initially absorbs kinetic energy. The sides of each bead are folded up against one another in the presence of corresponding deformation forces before the essentially smooth areas of the jacket between the beads are subjected to direct further deformation. These beads thus represent predetermined deformation points. Depending on the application and the level of kinetic energy to be absorbed, the jacketing configuration of the matrix body has a thickness of 0.3 mm to 2.0 mm. However, greater thicknesses are possible and appropriate for very high levels of kinetic energy to be absorbed. When aluminum is used as a jacket, a thickness of 0.5 to 2.0 mm is preferred, and a thickness of 0.03 to 1.5 mm is preferred in the case of steel, in particular deep-drawing steel.

In accordance with still an additional feature of the invention, the matrix body includes, in a manner known per se, packed flat layers of sheet metal or an essentially cylindrically wound assembly formed by a spiral, an involute shape or S shape, for instance. The individual layers of sheet metal resting upon one another in the assembly can, but need not, be brazed together in the areas of contact.

In accordance with another feature of the invention, the cell density of the matrix body is varied from section to section in the longitudinal direction. This is achieved, for example, by inserting additional layers of sheet metal with shallower corrugations or more widely spaced corrugations than in the corresponding adjacent section between essentially smooth layers of sheet metal. The smooth layers of sheet metal of the section with the lowest cell density are preferably disposed in such a way as to be continuous in the longitudinal direction of the matrix. It is also possible to vary the cell density of the matrix in the radial direction by winding up a layer of sheet metal with a corrugation frequency that increases continuously in one direction to form an essentially cylindrical honeycomb structure, for example. Varying the cell density furthermore has the advantage of providing intersecting boundary surfaces between channel walls within the honeycomb body. When deformation occurs, not only compression but also a shearing force occurs at these points since the metal sheets cut or tear one another. In accordance with a further feature of the invention, a similar effect can also be achieved if two or more honeycomb bodies are disposed in series, more specifically in such a way that as many layers of sheet metal from both bodies as possible cross at their adjoining ends. This can be achieved by using honeycomb bodies with a different winding direction, for example. This makes it possible for the configuration to absorb even more deformation energy with the same volume.

In accordance with an added feature of the invention, the layers of sheet metal of the matrix have bead-like structures essentially transversely to the direction of the channels. These structures are also referred to as transverse structures. These transverse structures serve to ensure that when a sufficiently high kinetic energy is introduced, deformation within the matrix body starts initially at the transverse structures so that in this way as uniform as possible absorption of the kinetic energy by the matrix body or by the matrix body and the jacketing configuration is ensured. In accordance with an additional feature of the invention, these transverse structures are preferably disposed at a spacing of from 2 mm to 20 mm.

In accordance with yet another feature of the invention, the layers of sheet metal of the matrix body forming the channels have laterally offset channel sections within the channels. Those channel sections are also referred to as longitudinal structures. These longitudinal structures thus do not provide continuous channels but rather discontinuous channels, with the result that the matrix body has a structure within it corresponding to a plate-fin structure, as is used inter alia for heat exchangers. The advantage of these longitudinal structures is that the kinetic energy-absorbing properties of the deformation element according to the invention can additionally be influenced in a specifically targeted manner through the use of the length of the channel sections that are offset section by section. This provides a further parameter for influencing the $F,s$ profile to suit the specific application.

In accordance with yet a further feature of the invention, the corrugations of the layers of sheet metal have a curved or herringbone configuration or a combination of the two. Through the use of such curved corrugations or herringbone-configuration corrugations on the layers of sheet metal, it is possible to achieve a specific distribution of the deformation-inducing forces introduced into the interior of the matrix body, thereby likewise enabling the $F,s$ profile to be influenced in an application-specific manner.

In accordance with yet an additional feature of the invention, the matrix body or its channels are filled with a foamed material. The foamed material is preferably a foamed plastic, in particular a corrosion-inhibiting foamed plastic. On one hand, this prevents corrosion from occurring within the matrix and the jacketing configuration if stainless steel is not used. For example, such corrosion potentially has a disadvantageous effect on the deformation properties. On the other hand, it is also possible, through the selection of an appropriate foamed plastic with defined properties, to influence the absorption capacity for kinetic energy in the element in a specifically targeted manner. As a result, it is also possible to influence the $F,s$ profile by introducing a foamed material.

In accordance with again another feature of the invention, with a view to a maximum deformation travel to be achieved relative to a defined overall length, the deformation element is constructed in such a way, with regard to its deformation behavior, that the maximum deformation travel is from about 60 to 200 mm. The deformation travel can also be less than or greater than the range stated, depending on the application.

With the objects of the invention in view, there is also provided a vehicle bumper system for absorbing kinetic energy, comprising a supporting structure having a support; and a deformation element having a honeycomb matrix body, in particular a metallic honeycomb matrix body, with a longitudinal axis and walls forming cavities, the walls having a main direction of extension, the deformation element having at least one end supported at the support of the supporting structure, and the deformation element secured at the supporting structure for introducing at least some forces developed during an impact into the walls at an angle to the main direction of extension.

In this case, the deformation element according to the invention is dimensioned in such a way that the initial peak in the $F,s$ profile is at least greatly reduced. This avoids a situation where large forces are transmitted to the supporting structure at the beginning of the introduction of kinetic energy into the deformation element, thus very largely excluding damage to the supporting structure.

It is thus possible to introduce even very high levels of kinetic energy without damaging the supporting structure. The improved deformation potential of such a deformation element thus resides in reducing the residual block length. This makes it possible to construct the deformation element according to the invention as an assembly component that can be removed with little outlay when kinetic energy has been introduced and converted into deformation and can be replaced by a new element. This not only increases safety in ram-type accidents and impacts but also makes a vehicle bumper system fitted with a deformation element according to the invention easier to repair.

With the objects of the invention in view, there is additionally provided a method for producing such a support assembly, which comprises producing an uncompressed deformation element having an $F,s$ diagram with an initial peak having a maximum; and then subjecting the deformation element to an initial compression with a deformation force greater than the maximum of the initial peak in the $F,s$ diagram of the uncompressed deformation element.

There is accordingly another way of producing a deformation element with the desired properties, namely without a significant initial peak in the $F,s$ profile, without extensive structural modifications to conventional honeycomb bodies. All that is required is to subject any honeycomb body produced in a manner that is known per se to a controlled initial compression. It is possible for this to be carried out during production or at the location of installation. The force employed for this purpose should be greater than the maximum force in the initial peak of the $F,s$ profile of the as yet uncompressed honeycomb body. The initial peak is thus traversed and eliminated before the deformation element is used for the first time. This gives rise to a honeycomb body that is already somewhat deformed and undergoes oblique introduction of force into its walls in accordance with the invention.

Other features which are considered as characteristic for the invention are set forth in the appended claims.

Although the invention is illustrated and described herein as embodied in a support assembly having a supporting structure and a deformation element for oblique introduction of force, a vehicle bumper system and a method of producing a support assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 6 is a sectional view of a deformation element in accordance with the invention, featuring a simplified representation of the matrix body;

FIG. 7 is a sectional view of the deformation element in accordance with FIG. 6 in a deformed state;

FIG. 8 is a fragmentary, sectional view of a fundamental configuration of a deformation element according to the invention, that is held at one end by the supporting structure;

FIG. 9 is a perspective view illustrating a fundamental production process for a honeycomb matrix body;

DESCRIPTION OF THE PREFERRED EMBODIMENTS

Figure 1:
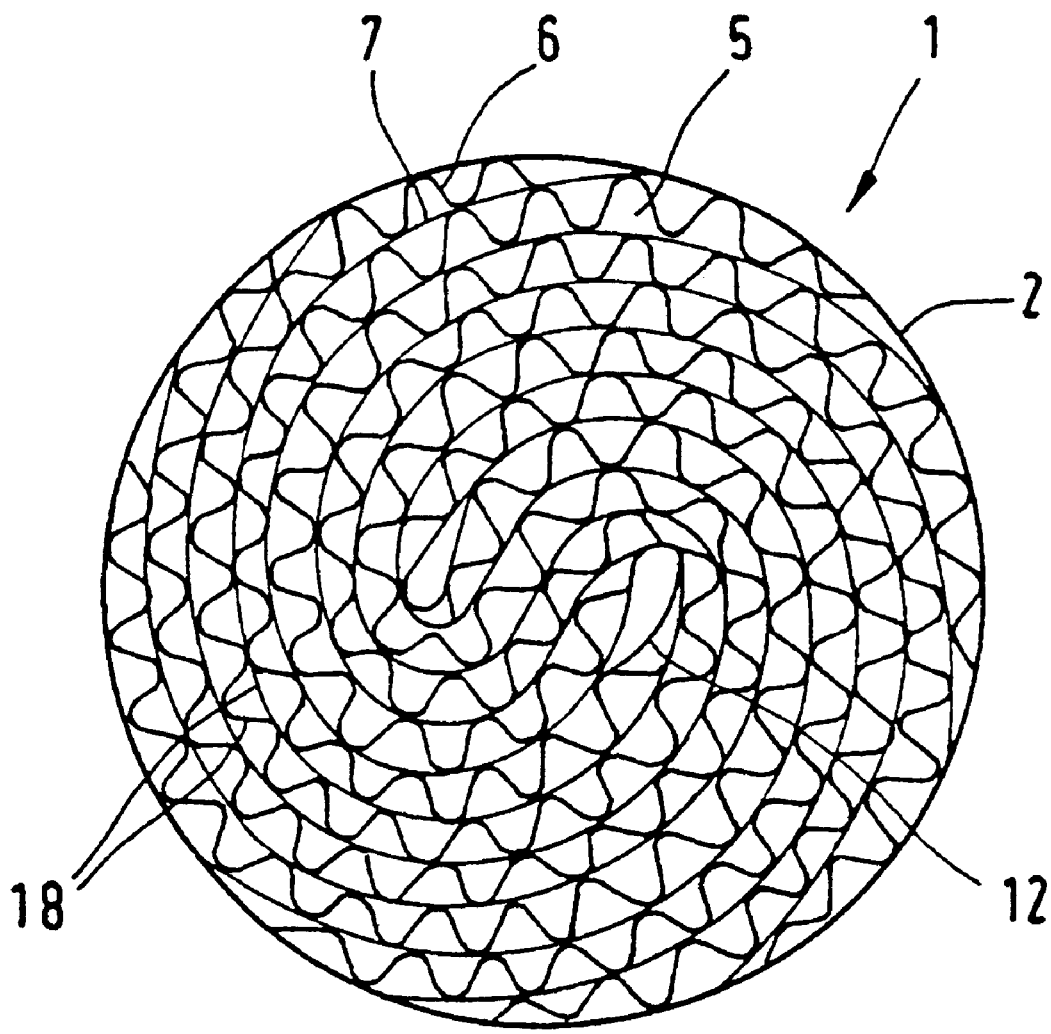
FIG. 1 is a diagrammatic, end-elevational view of a honeycomb structure which is known per se for a matrix body of a deformation element in an undeformed state.

Referring now to the figures of the drawings in detail and first, particularly, to FIG. 1 thereof, there is seen a cross sectional view of a honeycomb matrix body 1. The honeycomb matrix body 1 is made up of alternating corrugated layers 6 of sheet metal and essentially smooth layers 7 of sheet metal with two spiral arms 12 wound together. The smooth layers 7 of sheet metal essentially rest on corrugations of the corrugated layers 6 of sheet metal, thus forming a multiplicity of channels 5 within the matrix body. The channels 5 are separated from one another by walls 18 formed by the layers 6, 7 of sheet metal. The matrix body 1 is surrounded by a jacketing configuration 2. As a result, a deformation element having a very compact construction is provided. Such a deformation element is disposed in a supporting structure 4 seen in FIGS. 2, 3 and 4 in such a way that kinetic energy which can be absorbed through the use of the deformation element is introduced essentially at an angle to a longitudinal axis 13 of the matrix body 1 and of the deformation element.

Figure 2:
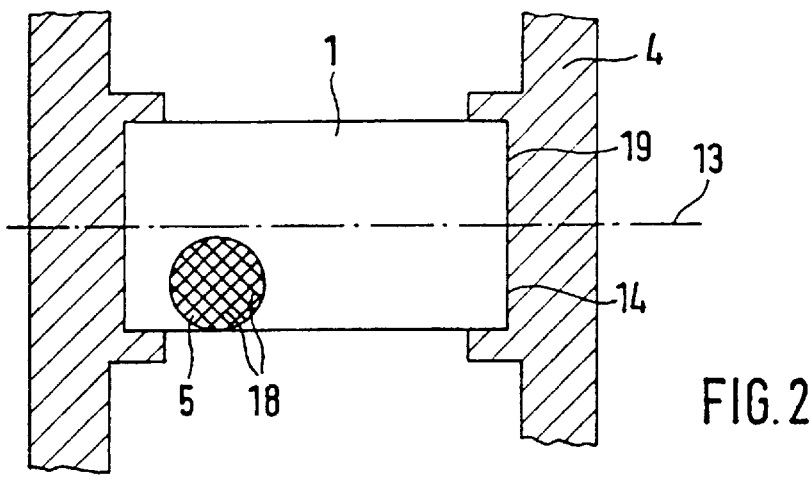
FIG. 2 is a fragmentary, partly sectional view of a fundamental configuration of a deformation element on a supporting structure in accordance with a first embodiment of the invention.
Figure 3:
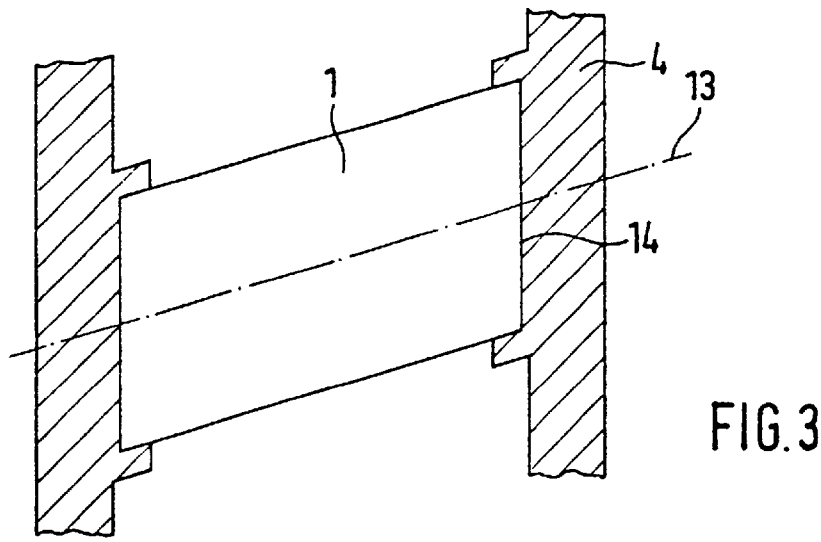
FIG. 3 is a fragmentary, partly sectional view of a fundamental configuration of a deformation element on the supporting structure in accordance with a second embodiment of the invention.
Figure 4:
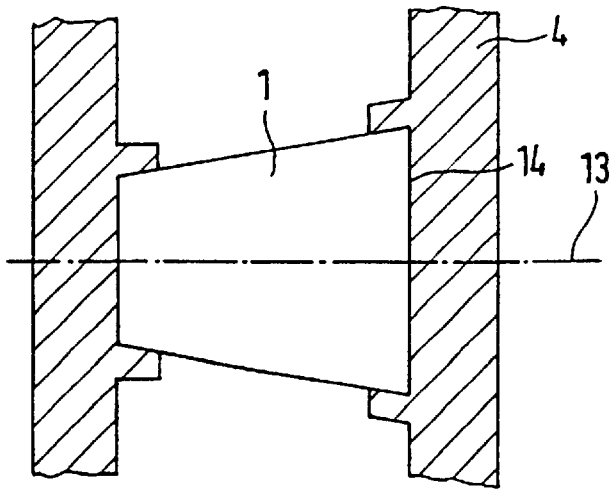
FIG. 4 is a fragmentary, partly sectional view of a fundamental configuration of a deformation element on the supporting structure in accordance with a third embodiment of the invention.

FIGS. 2 to 4 show three exemplary embodiments of the configuration of the matrix body 1 relative to the supporting structure 4. In the embodiment of FIG. 2, the longitudinal axis 13 of the matrix body 1 of the deformation element is disposed essentially perpendicular to a support 14 on the supporting structure 4. An end 19 of the matrix body 1 rests against a corresponding surface on the supporting structure 4. That surface may also have holes or recesses formed therein. In this case, the matrix body 1 is constructed from obliquely laid, wound or looped structured layers of sheet metal. The layers of sheet metal that are structured in this way are either wound, looped or laid obliquely relative to one another or it is also possible to place smooth layers 7 of sheet metal between the structured layers 6 of sheet metal that are laid obliquely relative to one another. This is illustrated, by way of example, in a circle in FIG. 2, which shows a simplified developed plan view of the layers of sheet metal laid crosswise one above the other. Placing layers of sheet metal in this way provides crossed channels 5 bounded by the walls 18 that form an angle relative to the longitudinal axis 13 of the matrix body 1. Due to this oblique configuration of the walls 18, forces are introduced at an angle to a main direction of extension of the walls 18.

According to another exemplary embodiment of the invention, which is illustrated in FIG. 3, the matrix body 1 is constructed in such a way that its longitudinal axis 13 is at an angle to the support 14 on the supporting structure 4. A matrix body 1 disposed in this way can be wound, looped or packed in a manner that is known per se, so that the channels formed by the walls extend essentially coaxially to the longitudinal axis 13. However, it is also possible, in the case of a configuration in accordance with the exemplary embodiment shown in FIG. 3, for the individual layers of sheet metal to be disposed with their structures crosswise or at an angle relative to the longitudinal axis 13. In these two cases as well, forces are introduced at an angle to the main direction of extension of the walls 18.

According to a further exemplary embodiment of the invention, which is illustrated in FIG. 4, the matrix body 1 is constructed as a frustoconical matrix body. In the case of a matrix body 1 constructed in this way, the longitudinal axis 13 is disposed essentially perpendicular to the support 14 on the supporting structure 4. Outside an area immediately surrounding the longitudinal axis 13, the main direction of extension of the walls is at an angle to the forces introduced in the direction of the longitudinal axis 13 in the event of an impact. As a result, at least some of the forces developed during an impact are introduced at an angle into the respective walls in the case of such a frustoconical matrix body 1.

During the introduction of kinetic energy, the walls of the respective layer of sheet metal which delimit the channels can deform into corresponding channel spaces. As a result, theoretically, a deformation element of this kind can continue to absorb kinetic energy for as long as there are cavities in the matrix body 1. During this process, the kinetic energy is absorbed both by the honeycomb matrix body 1 and by the jacketing configuration 2. However, the jacketing configuration can also be constructed in such a way that it does not serve to any significant extent, if at all, to absorb kinetic energy, but is merely constructed as a radial deformation limiter. Once the amount of kinetic energy being absorbed is such that those parts of the respective layers of sheet metal which form the walls have been deformed completely into the free spaces present in the channels, the deformation element reaches its final compression length, which is referred to as the residual block length. Once the residual block length of the deformation element has been reached, further compression beyond this residual block length is only possible through an extreme rise in forces required for further compression. For purposes of practical application, this means that, once this state, which essentially represents a final deformation state of the deformation element, has been reached, there is virtually no further deformation capacity, even if there is a sharp rise in the forces being introduced. This can result in damage to the supporting structure on which the deformation element is supported. This final rise is illustrated by reference numeral 17 in FIG. 12.

Figure 5:
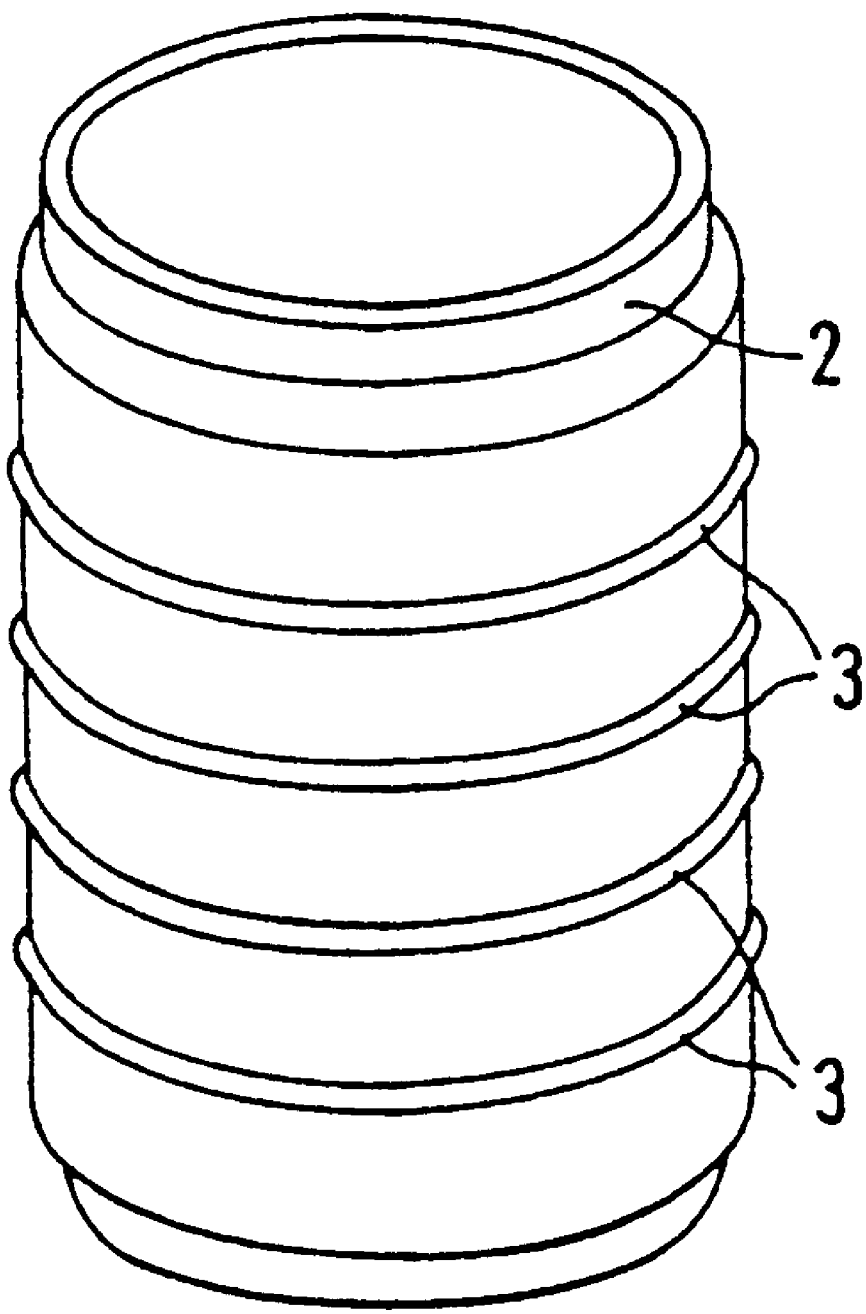
FIG. 5 is a perspective view of a fundamental representation of a jacketing tube for accommodating a cylindrical honeycomb matrix body.

FIG. 5 diagrammatically represents a jacketing configuration 2 in the form of a jacketing tube for a deformation element. This deformation element has encircling beads 3 on the outer periphery of its jacketing configuration 2. In order to influence the deformation properties of this deformation element in a specific way with regard to its $F_s$ profile, it is furthermore possible for each of the beads 3 to extend over only part of the circumference of the jacketing tube 2 or for these beads to run around at least some sections of the outer periphery of the jacketing tube 2 in a spiral.

FIG. 6 shows a deformation element according to the invention for use in a supporting structure 4 in accordance with the invention. The deformation element is illustrated in section. For the sake of simplicity, the section through the matrix body 1, which is known per se, is taken without showing the individual channels 5 or cavities of the matrix body 1. The matrix body 1 is surrounded by a jacketing configuration 2. In principle, however, it is also possible for the matrix body 1 to be self-supporting and to represent the actual deformation element. The deformation element shown is installed in the supporting structure 4 in such a way that the kinetic energy is introduced from the left in the figure. As kinetic energy is introduced, the deformation element absorbs the kinetic energy and converts it into corresponding deformation energy, providing a defined deformation. The ends of the deformation element are covered by respective non-illustrated supporting plates. The end 19 of the deformation element that is opposite to the end at which the kinetic energy is introduced, is in the form of a perforated plate 9, which has a hole 10 in a central area thereof. The hole 10 is large enough to ensure that even when the deformation element reaches its residual block length, it can be deformed further by deformation and shear forces associated with the introduction of correspondingly high kinetic energies, i.e. further deformation energy can be absorbed. A plurality of uniformly distributed holes 10 may be provided in an outer area of the perforated plate 9, as is indicated by broken lines. An edge 20 of the respective hole 10 extends over a plurality of layers 6, 7 of sheet metal.

According to FIG. 7, this is achieved by virtue of the fact that, if the kinetic energy being introduced is sufficiently large, material from the matrix body in the area of the hole 10 in the perforated plate 9 can push through the hole 10 along a deformation path and therefore out of the deformation element proper before the residual block length is reached. This gives rise to an at least partially sheared-off portion 11 of material, which ensures that the residual block length of such a deformation element according to the invention can be further reduced for given structural dimensions. This makes it possible to absorb higher deformation energies without the risk of damaging the supporting structure 4 on which the deformation element is supported.

It can be seen from FIGS. 1 to 7 that the $F_s$ profile of the deformation element according to the invention can be selectively influenced for the respective application by way of the following parameters: the construction of the jacketing configuration (wall thickness, with or without jacket beads), the matrix body construction (cell density, thickness of the layer of sheet metal) and the matrix body material (standard material, standard with transverse structures, or roll-bonded strip).

FIG. 8 shows a fundamental configuration of a deformation element held by the supporting structure 4. In this case, the deformation element is supported at one end by the supporting structure 4. The kinetic energy is introduced in the direction of the longitudinal axis 13 at the opposite end of the deformation element from the support 14. This kinetic energy is represented by the expression $m \times c^2/2$, where m is the mass of a moving object (not illustrated) and c is the velocity of the moving object. The task of the deformation element is to convert the kinetic energy being introduced into deformation and, with regard to the design load on the deformation element, this deformation should be performed exclusively by the deformation element itself without deformation of or damage to the supporting structure 4. A deformation element which is dimensioned in this way thus forms a replaceable component that is supported in the supporting structure 4 in such a way that it can be removed easily and replaced by a new one. This is especially important in the case of motor vehicles if a deformation element of this kind is used for a bumper system.

Figure 14:
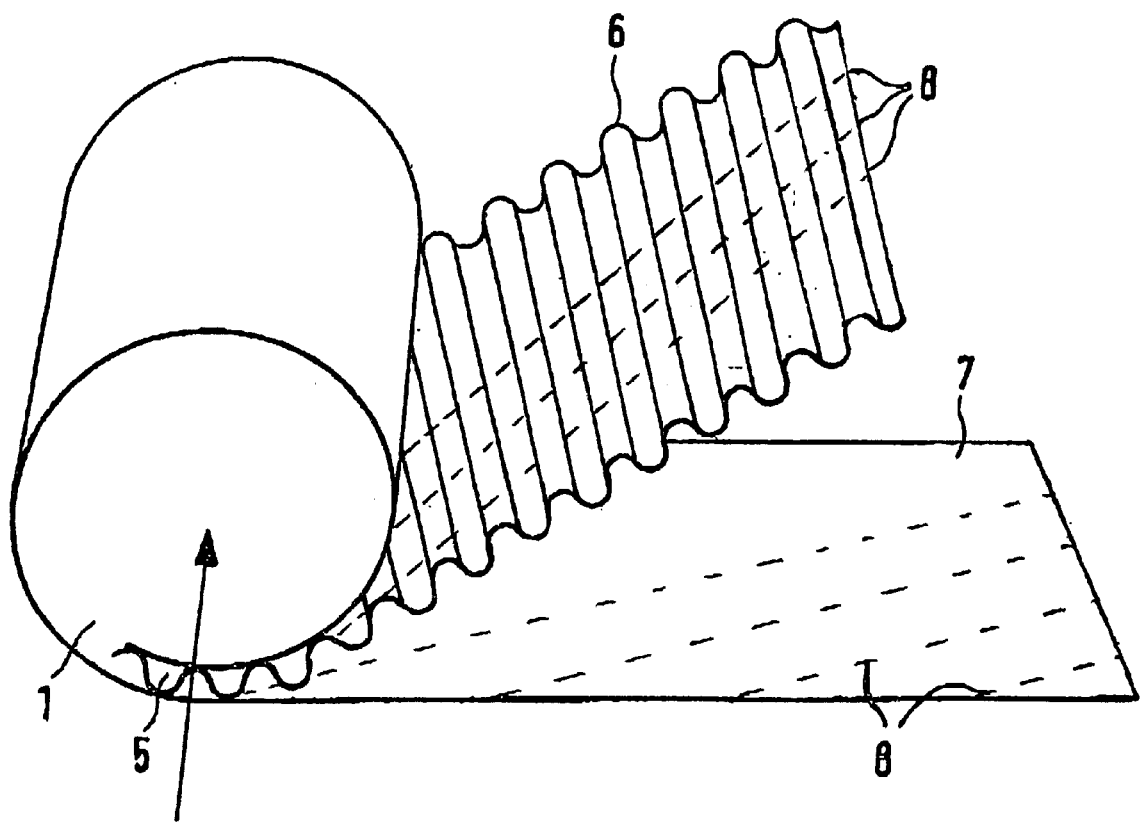
FIG. 14 is a perspective view of a matrix body.

FIG. 9 shows another exemplary embodiment of the fundamental construction of a matrix structure for a deformation element. The honeycomb matrix structure has a construction in which structured layers 6 of sheet metal provided with a corrugation are wound alternately in a spiral with essentially smooth layers 7 of sheet metal to provide an essentially cylindrical form of the honeycomb matrix body 1. The corrugations provide the honeycomb matrix body 1 with channels 5, which extend in the direction of the longitudinal axis 13 indicated by the arrow. Moreover, both the corrugated layers 6 of sheet metal and the essentially smooth layers 7 of sheet metal of the matrix body 1 additionally have microstructures 8 extending essentially transversely to the longitudinal extent of the channels 5. However, the microstructures 8 can also extend obliquely to the longitudinal extent of the channels 5, as illustrated in FIG. 14. These microstructures 8 represent predetermined deformation points for the deformation process during the action of a corresponding kinetic energy. Through the use of these points it is possible to dissipate an excessive initial peak 15 (seen in FIG. 12) reflected in the F,s profile, that would otherwise occur, especially at the beginning of the deformation process.

Figure 10:
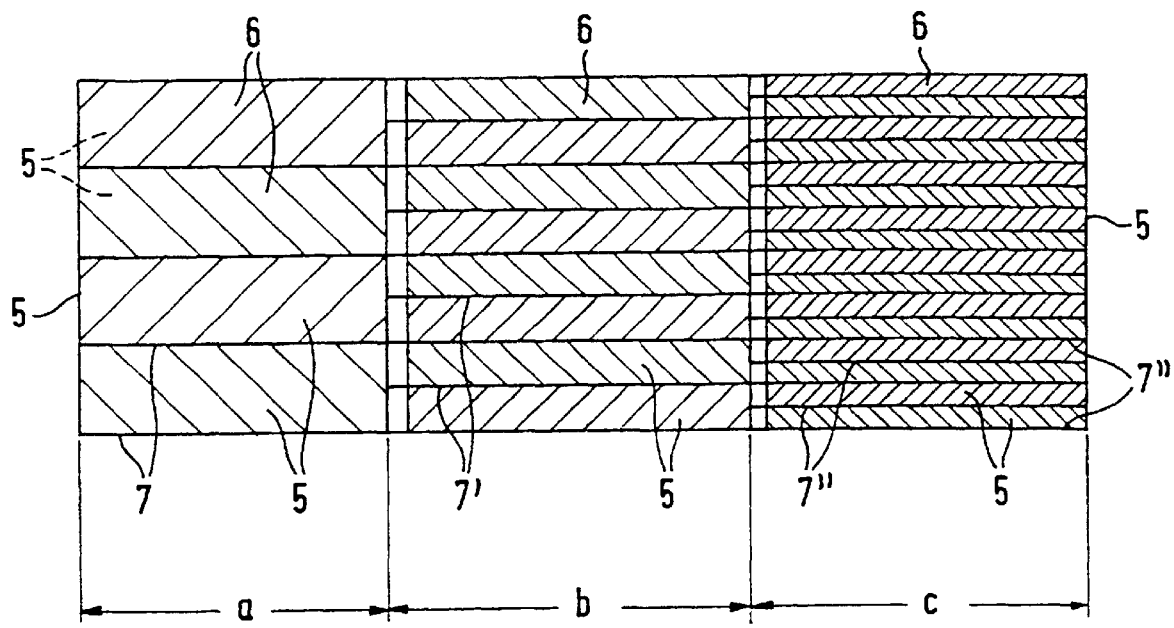
FIG. 10 is a sectional view taken in the direction of channels of the honeycomb matrix body, in which different cell densities are implemented in the direction of the channels.

FIG. 10 shows another exemplary embodiment. In this exemplary embodiment, the deformation element has three zones a, b, c, in which different cell densities are implemented. The illustration in FIG. 10 is a section taken in the direction of the channels 5. Smooth layers 7 of sheet metal extend over a length of the deformation element a+b+c in the direction of the channels 5. A structured layer 6 of sheet metal with a corrugation amplitude corresponding to the distance between the smooth layers 7 of sheet metal, as measured in the radial direction, is disposed in each case between smooth layers 7 of sheet metal in section a. In addition, smooth layers 7' of sheet metal are disposed between the layers 7 of sheet metal in sections b and c. Corrugated layers 6 of sheet metal are disposed between the smooth layers 7 and 7' of sheet metal in section b. These layers 6 have a corrugation amplitude corresponding to the distance between the layers 7 and 7' of sheet metal. In addition, further smooth layers 7" of sheet metal are disposed between the smooth layers 7 and 7' of sheet metal in section c. As a result, the smooth layers 7, 7' and 7" of sheet metal have corrugated layers 6 of sheet metal disposed between them and the corrugation amplitude thereof corresponds to the distance between the smooth layers 7 and 7" as well as 7" and 7'. This results in a deformation element constructed with a varying cell density in the longitudinal direction of the channels 5. The advantage of such a deformation element with a varying cell density is that the F,s profile can be selectively influenced section by section in individual areas of the deformation element. This in turn increases the versatility of the deformation element according to the invention in terms of its applications.

Figure 11:
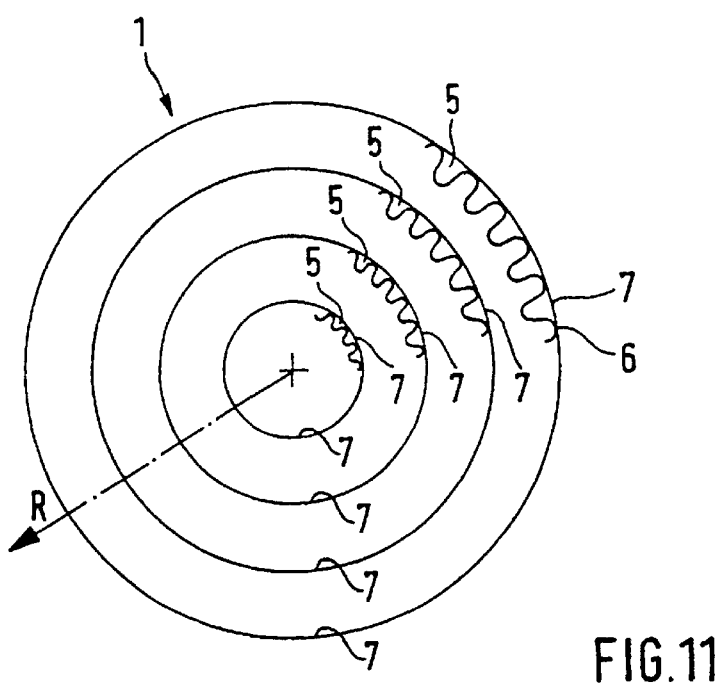
FIG. 11 is an end-elevational view of a deformation element in accordance with another exemplary embodiment of the invention, with a matrix body having cell densities that vary in the radial direction.

FIG. 11 shows another exemplary embodiment of a deformation element, in which the honeycomb matrix structure 1 is constructed from essentially concentric, alternately disposed smooth layers 7 and structured layers 6 of sheet metal. The corrugation amplitude of the structured layers 6 of sheet metal increases from the inside outwards in the direction of a radius R. In order to simplify the illustration, only a part of the smooth layers 7 of sheet metal and the structured layers 6 of sheet metal provided with corrugations has been illustrated. The channels 5 are formed by the corrugations of the structured layers 6 of sheet metal. In order to obtain a cell density that increases from the inside of a cylindrical matrix structure 1 outwards, it is also possible for the matrix body 1 to be wound in a spiral from a smooth layer 7 of sheet metal and a structured layer 6 of sheet metal disposed thereon with a corrugation amplitude that increases in one direction. This provides a continuous increase in the cell density of a honeycomb matrix body 1 of this kind from the inside outwards in the direction of the radius R.

Figure 12:
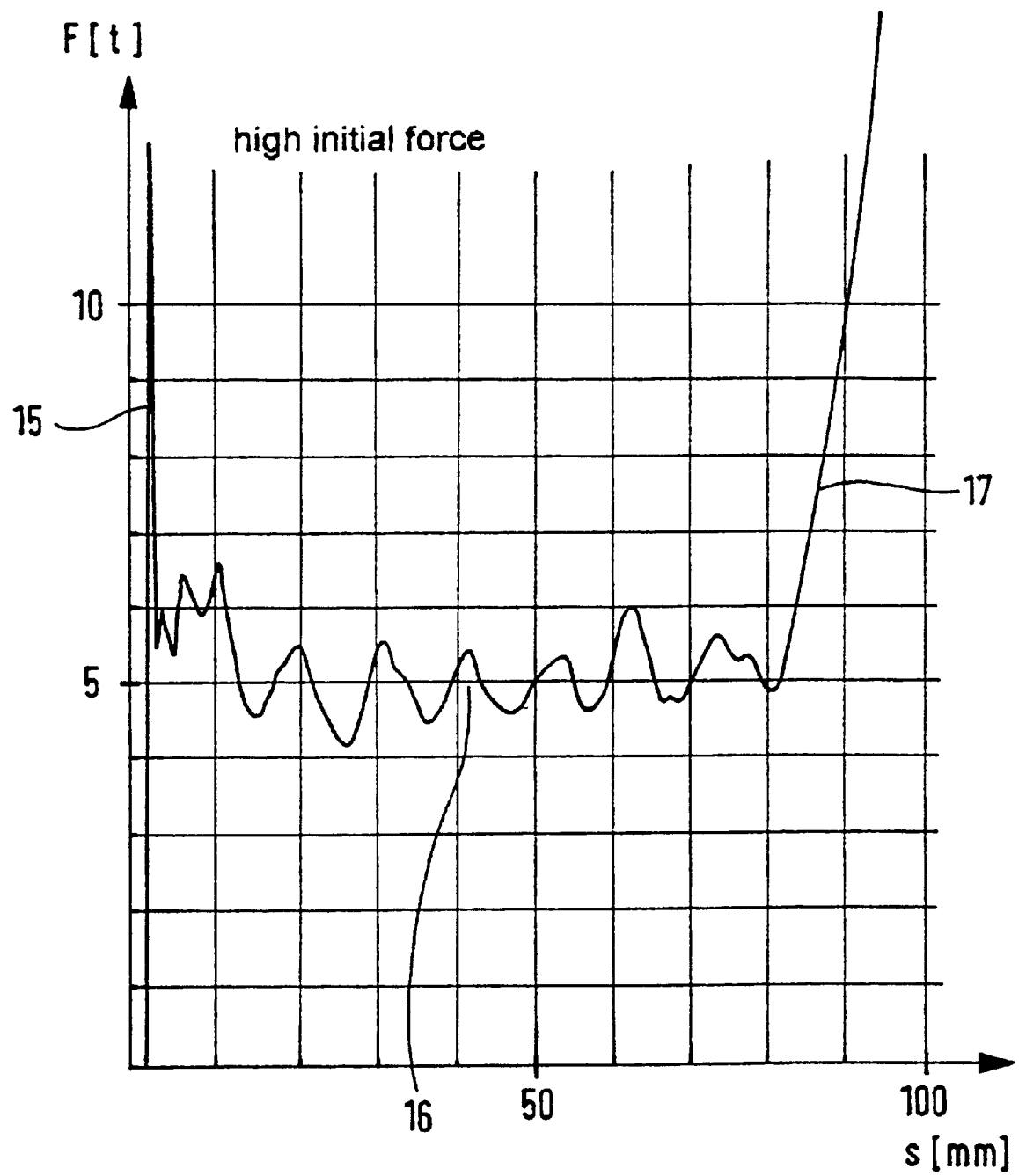
FIG. 12 is a graph showing a deformation force/deformation path profile ($F,s$ profile) for a first exemplary embodiment of the invention.
Figure 13:
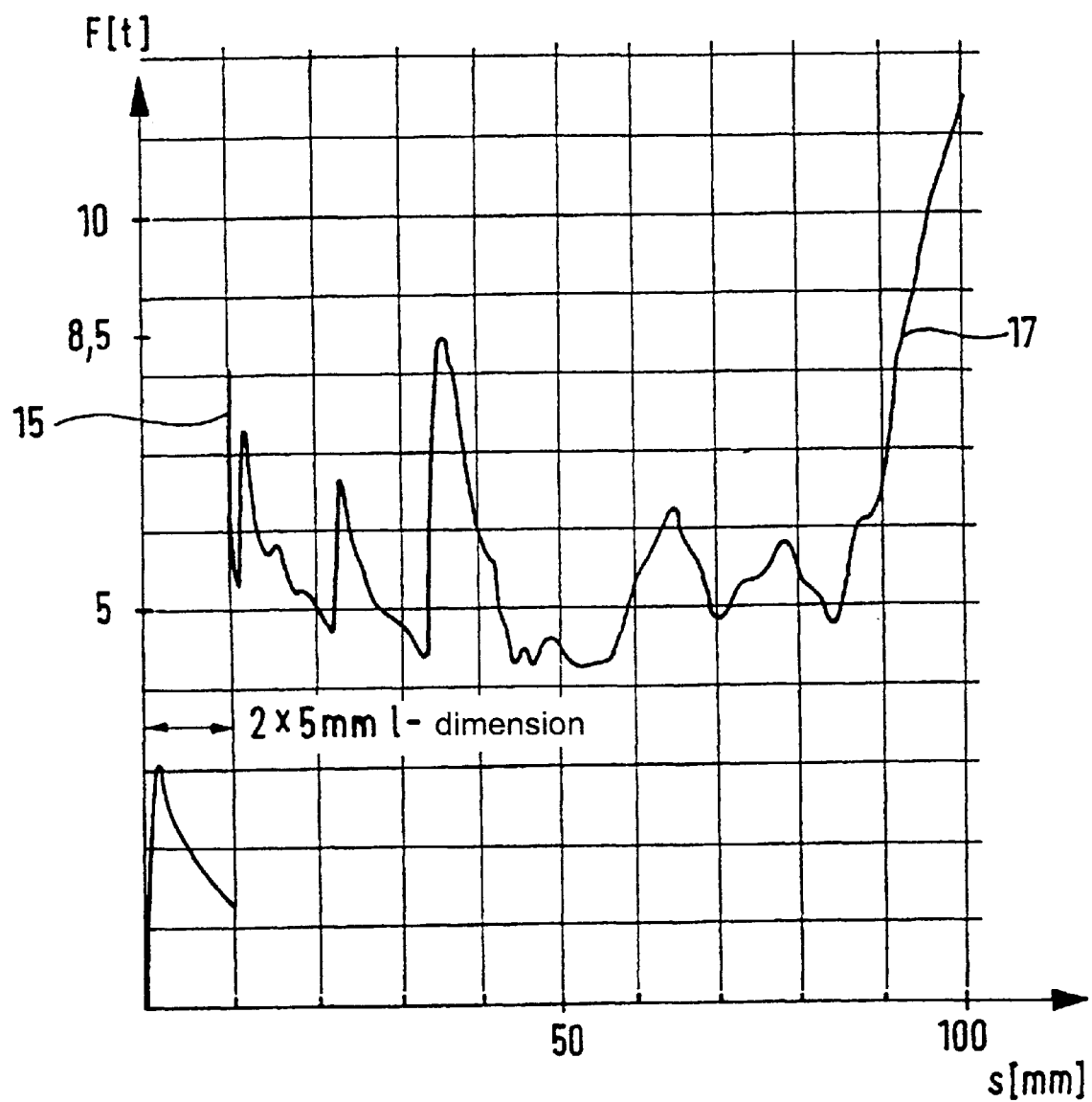
FIG. 13 is a graph showing an $F,s$ profile for a second exemplary embodiment in accordance with the invention.

FIGS. 12 and 13 each show an F,s profile, by way of example. These F,s profiles were determined in tests with the matrix body material being formed of steel (standard material) containing chromium and aluminum. The matrix body constructions studied had 160 cpsi, 100 cpsi and 0 cpsi (dealing only with compression of a jacket being formed of roll-bonded steel). The jacketing constructions studied were a jacket without beads, a jacket with three beads and a jacket with eight beads. The jacketing wall thicknesses employed were 0.5 mm and 0.8 mm. The deformation element studied was cylindrical. The jacketing configuration 2 had an overlap relative to the honeycomb matrix body 1 proper of 5 mm at each end. A perforated plate was not provided.

FIG. 12 shows an example of a test outcome, where a high initial force of about 130 kN occurs in the deformation element at the beginning, as a peak force, when a corresponding kinetic energy begins to be introduced, before an actual deformation takes place at forces of between 40 and 65 kN. In the case of the F,s profile shown, a central area 16 that follows the initial peak 15 is essentially constant, i.e. in the central area 16 the force only fluctuates slightly around a mean value of about 50 kN. When the final deformation state (residual block length) is reached, which is about 85 mm in the case of the deformation element studied, the final rise 17 occurs. This means that there is almost no more deformation if the compressive load on the deformation element is increased further.

If additional beads are introduced into the jacket, as is illustrated in FIG. 5, the beads 3 are deformed first. This means that the matrix body 1 initially slides in the jacketing configuration 2 until the respective sides of the beads 3 have been folded up against one another under a force of about 25 to 10 kN (see FIG. 13). It is only then, as is shown in FIG. 13, that there is a jump, representing the actual initial peak, to about 85 kN. The initial peak 15, i.e. the initial force, can be lowered by reducing the thickness of the jacketing material from 0.8 mm to 0.5 mm. Due to the thinner jacket material, the remaining residual height of a flattened deformation element of this kind is somewhat less than in the case of a jacket material with a thickness of 0.8 mm. This means that the maximum deformation travel is greater.

The height of the initial peak 15 can likewise be reduced somewhat if the thickness of the jacketing configuration 2 is 0.8 mm and three beads are provided. It was not possible to reduce the initial peak 15 further by placing eight beads in a jacketing configuration 2 with a thickness of 0.8 mm.

If the jacketing configuration 2 is provided with an overlap of 5 mm at each end of the matrix body 1, this overhang acts as a preliminary deformation stage.

While the F,s profile shown in FIG. 13 was recorded for a matrix body 1 with 100 cpsi, the F,s profile shown in FIG. 12 corresponds to a matrix body 1 with 160 cpsi. From this, it can be seen that, with increasing cell density, the mean deformation force in the central area 16 of the F,s profile is not only reduced but can also be made significantly more uniform. The advantage of a uniform central area 16 in the F,s profile is that the kinetic energy can be absorbed uniformly by the deformation element, thus reducing the loads on the supporting structure 4 supporting the deformation element and therefore the risk that this supporting structure 4 will be damaged.

It is likewise possible to reduce the mean deformation force in the central area 16 of the $F_s$ profile as compared with standard material by using a material with a transverse structure in the corrugation for the structured layer 6 of sheet metal. A further reduction can be achieved by using roll-bonded strip instead of the corrugation with a transverse structure.

We claim:

1. A support assembly for absorbing kinetic energy during an impact, comprising:
   a supporting structure having a support; and
   a deformation element having a honeycomb matrix body with a longitudinal axis and walls forming cavities, said walls having a main direction of extension, said deformation element having at least one end supported at said support of said supporting structure, and said deformation element secured at said supporting structure for introducing at least some forces developed during an impact into said walls at an angle to said main direction of extension, said matrix body formed of at least one at least partially structured layer of sheet metal looped, wound or stacked to form said walls and to orient a main direction of extension of said at least one layer of sheet metal at an angle to said longitudinal axis.

2. The support assembly according to claim 1, wherein said matrix body has a multiplicity of channels, said at least one layer of sheet metal is at least one aluminum sheet having a thickness of 0.02 mm to 0.2 mm, and said matrix body has a cell density of 50 to 600 cells per square inch.

3. The support assembly according to claim 1, wherein said matrix body has a multiplicity of channels, said at least one layer of sheet metal is at least one aluminum sheet having a thickness of from 0.1 to 0.2 mm, and said matrix body has a cell density of 50 to 600 cells per square inch.

4. The support assembly according to claim 1, wherein said matrix body has a multiplicity of channels, said at least one layer of sheet metal is at least one steel sheet having a thickness of 0.02 to 0.15 mm, and said matrix body has a cell density of 50 to 600 cells per square inch.

5. The support assembly according to claim 1, wherein said longitudinal axis of said matrix body is disposed substantially perpendicular to said support.

6. The support assembly according to claim 1, wherein said longitudinal axis of said matrix body is disposed at an angle to said support.

7. The support assembly according to claim 1, wherein said matrix body formed of said at least one looped, wound or stacked layer of sheet metal is conical.

8. The support assembly according to claim 1, wherein said matrix body formed of said at least one looped, wound or stacked layer of sheet metal is frustoconical.

9. The support assembly according to claim 1, wherein said deformation element has a deformation force/deformation path profile with at most a relatively small initial peak.

10. The support assembly according to claim 9, wherein said walls of said matrix body have a suitable multiplicity of predetermined deformation points making at least one section of said deformation force/deformation profile constant.

11. The support assembly according to claim 10, wherein said walls of said matrix body have a suitable multiplicity of predetermined deformation points making at least one section of said deformation force/deformation profile rise progressively.

12. The support assembly according to claim 1, wherein said deformation element has at least one perforated plate at least at said at least one end supported at said support of said supporting structure, said at least one perforated plate has at least one hole formed therein, and said at least one hole is dimensioned to permit parts of said matrix body disposed in the vicinity of said at least one hole to be displaced in a direction of deformation.

13. The support assembly according to claim 12, wherein said at least one hole in said at least one perforated plate is a plurality of uniformly distributed holes.

14. The support assembly according to claim 12, wherein said at least one hole has a respective edge extended over a plurality of layers of sheet metal.

15. The support assembly according to claim 14, wherein said at least one hole has a size causing said respective edge to extend over at least ten layers of sheet metal.

16. The support assembly according to claim 12, wherein said at least one hole is a plurality of holes disposed in an outer area of said at least one perforated plate.

17. The support assembly according to claim 12 wherein 20 to 80% of a total area of said at least one perforated plate is covered by said at least one hole.

18. The support assembly according to claim 12, wherein 40 to 60% of a total area of said at least one perforated plate is covered by said at least one hole.

19. The support assembly according to claim 12, wherein said at least one perforated plate has an edge integrated into said support of said supporting structure.

20. The support assembly according to claim 12, wherein said matrix body has a jacketing configuration with a plurality of separate jacketing rings.

21. The support assembly according to claim 20, wherein said jacketing configuration is a continuous jacketing tube with predetermined buckling points.

22. The support assembly according to claim 21, wherein said predetermined buckling points are substantially encircling beads.

23. The support assembly according to claim 20, wherein said jacketing configuration has a thickness of 0.5 mm to 2.0 mm.

24. The support assembly according to claim 1, wherein said matrix body has sections, a multiplicity of channels and a cell density of 50 to 600 cells per square inch varying from section to section in the direction of said channels.

25. The support assembly according to claim 1, wherein said matrix body is wound in a shape selected from the group consisting of a spiral shape, an involute shape and an S-shape, to form a substantially cylindrical assembly.

26. The support assembly according to claim 1, wherein said matrix body is looped in a shape selected from the group consisting of a spiral shape, an involute shape and an S-shape, to form a substantially cylindrical assembly.

27. The support assembly according to claim 1, wherein said matrix body has a multiplicity of channels extended in a given direction, and said at least one layer of sheet metal of said matrix body has bead-like transverse structures disposed transversely to said given direction.

28. The support assembly according to claim 1, wherein said matrix body has a multiplicity of channels extended in a given direction, and said at least one layer of sheet metal of said matrix body has bead-like transverse structures disposed obliquely to said given direction.

29. The support assembly according to claim 27, wherein said bead-like structures of said matrix body are disposed at a spacing of from 2 mm to 20 mm.

30. The support assembly according to claim 28, wherein said bead-like structures of said matrix body are disposed at a spacing of from 2 mm to 20 mm.

31. The support assembly according to claim 1, wherein said at least one layer of sheet metal of said matrix body forms a multiplicity of channels and has laterally offset channel sections.

32. The support assembly according to claim 1, wherein said at least one layer of sheet metal of said matrix body has corrugations with a configuration selected from the group consisting of curved and herringbone.

33. The support assembly according to claim 1, wherein said honeycomb matrix body is filled with a foamed material.

34. The support assembly according to claim 33, wherein said foamed material is a foamed plastic.

35. The support assembly according to claim 33, wherein said foamed material is a corrosion-inhibiting foamed plastic.

36. The support assembly according to claim 1, wherein said deformation element has a maximum deformation travel of 60 mm to 200 mm.

37. The support assembly according to claim 1, wherein said deformation element contains at least one other matrix body, said matrix bodies have layers of sheet metal and adjoining ends, and said matrix bodies are disposed in series with as many opposite layers of sheet metal as possible crossing one another at said adjoining ends of each two of said matrix bodies.

38. A method for producing a support assembly according to claim 1, which comprises:
producing an uncompressed deformation element having a deformation force/deformation diagram with an initial peak having a maximum; and
then subjecting the deformation element to an initial compression with a deformation force greater than the maximum of the initial peak in the deformation force/deformation diagram of said uncompressed deformation element.

39. A support assembly for absorbing kinetic energy during an impact in a motor vehicle, comprising:
a supporting structure having a support; and
a deformation element having a honeycomb matrix body with a longitudinal axis and walls forming cavities, said walls having a main direction of extension, said deformation element having at least one end supported at said support of said supporting structure, and said deformation element secured at said supporting structure for introducing at least some forces developed during an impact into said walls at an angle to said main direction of extension, said matrix body formed of at least one at least partially structured layer of sheet metal looped, wound or stacked to form said walls and to orient a main direction of extension of said at least one layer of sheet metal at an angle to said longitudinal axis.

40. A vehicle bumper system for absorbing kinetic energy, comprising:
a supporting structure having a support; and
a deformation element having a honeycomb matrix body with a longitudinal axis and walls forming cavities, said walls having a main direction of extension, said deformation element having at least one end supported at said support of said supporting structure, and said deformation element secured at said supporting structure for introducing at least some forces developed during an impact into said walls at an angle to said main direction of extension, said matrix body formed of at least one at least partially structured layer of sheet metal looped, wound or stacked to form said walls and to orient a main direction of extension of said at least one layer of sheet metal at an angle to said longitudinal axis.

41. The vehicle bumper system according to claim 40, wherein said honeycomb matrix body is a metallic honeycomb matrix body.

* * * * *